United States Patent Office 3,551,455
Patented Dec. 29, 1970

3,551,455
TOTAL SYNTHESIS OF ZEARALENONE
Narindar N. Girotra, Rahway, and Norman L. Wendler, Summit, N.J., assignors to Merck & Co., Inc., Rahway, N.J., a corporation of New Jersey
No Drawing. Filed Sept. 13, 1967, Ser. No. 667,361
Int. Cl. C07d 7/24, 9/00
U.S. Cl. 260—343.2                  9 Claims

ABSTRACT OF THE DISCLOSURE

The potent anabolic macrolide (±)-zearalenone and 4-mono- and 2,4-diether derivatives thereof are prepared by total chemical synthesis involving condensation of 3,5-diloweralkoxyhomophthalic anhydride with 4-(2'-methoxy-6'-methyltetrahydropyran - 2 - yl)-butyraldehyde to form the lactonic acid, 3-(4'-oxo-8'-hydroxynonyl)-6,8-diloweralkoxy-3,4-dihydroisocoumarin - 4 - carboxylic acid; heating said lactonic acid to produce 2-(10'-hydroxy-6'-oxo-1'-undecenyl)-4,6 - diloweralkoxybenzoic acid; cyclizing said benzoic acid with trifluoroacetic anhydride to give (±)-zearalenone diloweralkyl ether; and selectively cleaving said diether with boron tribromide to give (±)-zearalenone or the corresponding 4-mono-loweralkyl ether.

This invention relates to a new and improved process for the total chemical synthesis of the physiologically active macrolide, (±)-zearalenone (i.e. (±)-6-(10'-hydroxy-6'-oxo - trans - 1' - undecenyl)-β-resorcylic acid lactone). More particularly, this invention relates to a new and improved process for the total chemical synthesis of racemic (±)-zearalenone, and the 4-mono- and 2,4-diether derivatives thereof, from well known and readily available starting materials, to novel intermediates obtained in said synthesis, and to processes for making such intermediates.

Racemic (±)-zearalenone, a potent anabolic agent useful in the raising of meat-producing animals, originally was prepared by fermenting the microorganism, *Gibberella zeae* (Gordon), on a suitable nutrient medium according to the techniques described in U.S. Pat. No. 3,169,019. More recently there has been described the total chemical synthesis of racemic (±)-zearalenone and the 2,4-dimethyl ether derivative thereof (Taub et al., Chemical Communications, 1967, p. 225). The process of the instant invention affords a new and more direct route to the total synthesis of (±)-zearalenones.

The instant invention is based upon applicants' discovery that racemic (±)-zearalenone can be readily prepared according to the reaction scheme generally set forth below, all steps proceeding readily in a straightforward manner and requiring nothing other than that apparatus and equipment conventional to the chemical laboratory.

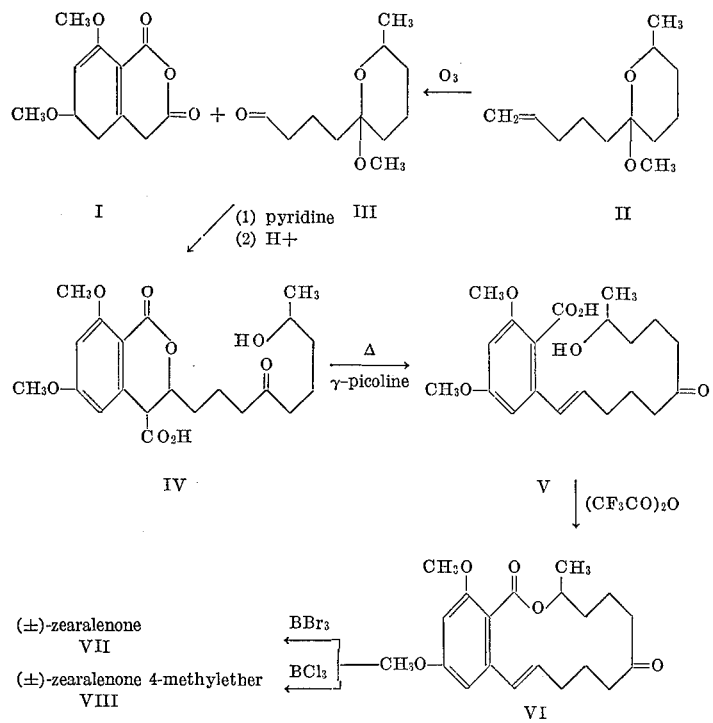

As starting materials in the reaction sequence set forth above there are employed 3,5-dimethoxyhomophthalic anhydride (I), a compound well known in the art, and 4-(2'-methoxy - 6' - methyltetrahydropyran-2-yl)-butyraldehyde (III). The aldehyde is readily prepared by ozonolysis of the corresponding olefin (II), 2-(pent-4'-enyl)-2-methoxy-6-methyltetrahydropyran, the "aliphatic component" described by Taub et al., supra. Ozonolysis conveniently is carried out by dissolving the olefin in a suitable organic solvent such as ethyl acetate or methylene chloride, and exposing the solution, cooled to about −65° C., to a stream of ozone until the solution is saturated. After removal of excess ozone, i.e. by passing through the reaction mixture an inert gas such as nitrogen, the reaction mixture is hydrogenated in the presence of a catalytic quantity of palladium-carbon and palladium-calcium carbonate. The catalyst is removed by filtration and the filtrate is washed with aqueous sodium bicarbonate, dried over a desiccant and evaporated to yield the desired aldehyde.

Applicants have found that 3,5-dimethoxyhomophthalic anhydride (I) condenses with 4-(2'-methoxy-6'-methyltetrahydropyran-2-yl)-butyraldehyde (III) to give, after acidification, 3-(4'-oxo-8'-hydroxynonyl) - 6,8-dimethoxy-3,4-dihydroisocoumarin-4-carboxylic acid (IV). The condensation proceeds readily in pyridine solution at about room temperature. Condensation is usually complete in about 3 to about 5 hours, after which the reaction mixture is diluted with water, made acid with dilute mineral acid, and extracted with a suitable organic solvent such as chloroform, methylene chloride and ethyl acetate. For further purification, the organic layer may be washed with water and extracted with aqueous sodium bicarbonate. The aqueous alkaline phase is then made acid with dilute mineral acid and is again extracted with a suitable organic solvent. After washing with water, the organic layer is dried over a desiccant and evaporated to yield the lactonic acid.

As the next step in the novel process of the instant invention the lactonic acid (IV) is caused to undergo decarboxylation with concomitant lactone-ring opening to yield the known seco acid precursor of (±)-zearalenone dimethyl ether, 2-(10'-hydroxy-6'-oxo-1'-undecenyl)-4,6-dimethoxybenzoic acid, (V) (see Taube et al., supra). This reaction is carried out by heating the lactonic acid (IV) at about 130° C. to 180° C. in pyridine or methylated pyridines such as α, β, or γ-picoline, lutidine, and collidine, γ-pyridine being preferred. The reaction, usually carried out under an inert atmosphere (nitrogen, for example), is generally complete in about 4 to about 8 hours, after which the reaction mixture is cooled, diluted with water, made acidic with dilute mineral acid, and extracted with a suitable organic solvent such as chloroform, methylene chloride and ethyl acetate. The organic layer is then washed with water and extracted with aqueous sodium bicarbonate. The desired seco acid is recovered from the aqueous alkaline layer in the manner previously described.

As noted above, the seco acid (V) is a known precursor of (±)-zearalenone dimethyl ether (VI) into which it may be converted directly through cyclization by treatment with trifluoroacetic anhydride according to techniques described in the art. The reaction is carried out in the cold in a suitable organic solvent such as benzene, toluene or xylene. Reaction is generally complete in about ½ to three hours, after which the reaction mixture is made alkaline with aqueous base and the desired (±)-zearalenone diether is extracted into a non-polar organic solvent such as benzene or toluene, from which it is recovered and purified by known chemical techniques.

Racemic (±)-zearalenone (VII) per se is obtained from the diether by ether cleavage with boron tribromide. This reaction is a rapid one and the ether cleavage is complete in a matter of minutes at temperatures of from about −10° C. to about 15° C. Removal of the reaction solvent, methylene chloride, for example, affords a crude product which may be purified either by conventional crystallization or by chromatography on an adsorbent such as silica gel followed by crystallization.

Where (±)-zearalenone 4-methylether (VIII) is desired, (±)-zearalenone dimethyl ether is subjected to selective ether cleavage with boron trichloride substantially as described above. In this case, however, the cleavage of the ether radical at the 2-position is essentially instantaneous. Thus, the diether is contacted only momentarily with the boron trichloride, desirably less than one minute.

The best mode contemplated by applicants for carrying out their invention will now be set forth as follows, no limitation being intended except as set forth in the appended claims.

EXAMPLE 1

4-(2'-methoxy-6'-methyltetrahydropyran-2-yl)-butyraldehyde (III)

(A) 5-hydroxy-δ-hexanolactone.—To a stirred solution of 13.014 g. of 4-acetylbutyric acid in 80 ml. of water containing 10.082 g. of sodium bicarbonate there is added portionwise at 0° C., 1.89 g. of sodium borohydride. The resulting reaction mixture is stirred at ca. 25° C. for 4 hours and then made acidic with hydrochloric acid to pH 2. The mixture is allowed to stand for 19 hours at room temperature, and then is saturated with sodium chloride and extracted with diethyl ether. The ether extract is washed twice with saturated sodium chloride solution and dried over anhydrous sodium sulfate. The ether solution is evaporated to a residue, and the residue distilled in vacuo to afford the title compound.

(B) 2-(pent-4'-enyl)-6-Δ²-dihydropyran.—To a stirred suspension of 7.296 g. of activated magnesium in 40 ml. of dry ether there is added a solution of 35.397 g. of 1-bromo-4-pentene in 90 ml. of dry ether under an atmosphere of nitrogen. This is accomplished by first adding a small amount of the bromo compound and heating the mixture to reflux in order to initiate the reaction. The remaining amount of bromopentene is added at a rate such that the reaction mixture refluxes without an external source of heat. After the addition is complete (1⅓ hours), the reaction mixture is refluxed for an additional 40 minutes and then cooled to room temperature. The 4-pentenyl magnesium bromide Grignard reagent thus prepared is added dropwise to a stirred solution of 27.108 g. of 5-hydroxy-δ-hexanolactone in 300 ml. of dry ether at −15° C. over a 2 hour period and under an atmosphere of nitrogen. The resulting heterogeneous reaction mixture is stirred at −10° C. for thirty minutes and then treated with a saturated aqueous solution of ammonium chloride. The aqueous layer is extracted with ether. The ether solution and extracts are combined and extracted with 5 percent aqueous sodium hydroxide in order to remove any unreacted lactone. The ether solution is then washed successively with water, saturated ammonium chloride and saturated sodium chloride. It is then dried over anhydrous sodium sulfate, and the ether removed by evaporation in vacuo. The residue, which contains a large proportion of 10-hydroxy-1-undecen-6-one, is distilled in vacuo to afford the title compound.

(C) 2 - (pent-4'-enyl)-2-methoxy-6-methyltetrahydropyran (II).—40 ml. of 1 percent HCl-methanol solution is added with stirring to 15.3 g. of 2-(pent-4-enyl)-6-methyl-Δ²-dihydropyran at 0° C. With the first addition of about 1 ml. of 1 percent HCl-methanol the temperature of the reaction mixture rises to about 50° C. It is cooled to 25° C. and the rest of the methanolic hydrogen chloride is added at that temperature. The mixture is stirred for 3½ hours, and then an excess of solid sodium bicarbonate is added to it. It is stirred for 15 minutes at room temperature and the reaction mixture then filtered to remove the solids. The filtrate is evaporated to a residue at 30° C. under vacuum. A small volume of ether is added, the mixture filtered, and the filtrate distilled in vacuo to give 2-(pent-4'-enyl)-2-methoxy-6-methyltetrahydropyran as a colorless oil.

(D) 4 - (2'-methoxy-6'-methyltetrahydropyran-2-yl)-butyraldehyde (III).—Expose a solution of 3.966 g. of 2-(pent-4'-enyl)-2-methoxy-6 - methyltetrahydropyran in 50 ml. of ethylacetate to a steady stream of 3 percent ozone at about −65° C. until the solution is saturated with ozone. Remove excess ozone by bubbling nitrogen through the reaction mixture. Hydrogenate the reaction mixture in the presence of 0.792 g. of 10 percent Pd—C and 0.792 g. of 5 percent Pd—CaCO$_3$. Remove the catalyst by filtration and wash the filtrate with 5 percent aqueous sodium bicarbonate solution. Dry the filtrate over anhydrous sodium sulfate and evaporate to obtain the title compound.

EXAMPLE 2

3-(4'-oxo-8'-hydroxynonyl)-6,8-dimethoxy-3,4-dihydroisocoumarin-4-carboxylic acid (IV)

Allow to stand at room temperature for about 4 hours a solution of 0.556 g. of 3,5-dimethoxyhomophthalic anhydride and 0.751 g. of 2-methoxy-6-methyltetrahydropyran-2-butyraldehyde in 5 ml. of dry pyridine. Dilute the reaction mixture with water, make acidic with dilute hydrochloric acid, and extract with chloroform. Wash the chloroform layer with water and extract with 5 percent aqueous sodium bicarbonate solution. Make the alkaline layer acidic with dilute hydrochloric acid and extract with chloroform. Wash the chloroform extract with water, dry over anhydrous sodium sulfate, and evaporate to yield the title compound.

EXAMPLE 3

2-(10'-hydroxy-6'-oxo-1'-undecenyl)-4,6-dimethoxybenzoic acid (V)

Heat to 145° C.–150° C. for about 6 hours a solution of 0.200 g. of the lactonic acid prepared in Example 2 in 0.8 ml. of γ-picoline under a nitrogen atmosphere. Cool the reaction mixture, dilute with water, make acidic with dilute hydrochloric acid, and extract with chloroform. Wash the chloroform layer with water and extract with 5 percent aqueous sodium bicarbonate. Make the alkaline layer acidic with dilute hydrochloric acid and extract with chloroform. Wash the chloroform extract with water, dry over anhydrous sodium sulfate, and evaporate to give the title compound.

EXAMPLE 4

(±)-Zearalenone dimethyl ether (VI)

20 ml. of trifluoroacetic anhydride is added dropwise over 1 hour to a stirred cold (10° C.) solution of 10.0 g. of 2 - (10'-hydroxy-6'-oxo-1'-undecenyl)-4,6-dimethoxybenzoic acid in 2800 ml. of benzene. The addition is carried out in a nitrogen atmosphere. The cooling bath is then removed and the mixture stirred for an additional hour. It is then cooled to 10° C. and 5 percent aqueous sodium hydroxide is added (about 200 ml.) with stirring until the mixture is basic. The layers are separated, the aqueous layer is extracted twice with benzene, and the combined benzene layer and extracts washed twice with water, once with saturated sodium chloride solution, dried over magnesium sulfate, and concentrated to dryness under vacuum. The residue is dissolved in chloroform and chromatographed on about 150 g. of silica gel H. The column is eluted with chloroform containing 4 percent acetone. The fractions containing the (±)-zearalenone dimethyl ether (as determined by thin layer chromatography) are combined and concentrated to dryness in vacuo. The residue thus obtained is crystallized from 9:1 ether-acetone to give pure (±)-zearalenone dimethyl ether.

EXAMPLE 5

(±) Zearlalenone (VII)

To a stirred solution of 120 mg. of (±)-zearalenone dimethyl ether in 1.2 ml. of methylene chloride under nitrogen at 0° C. there is added a cooled (0° C.) solution of 0.5 ml. of boron tribromide in 0.8 ml. of methylene chloride. The cooling bath is removed and after 5 minutes the reaction mixture is concentrated to dryness under water pump vacuum (bath temperature 30° C.). The resulting solid residue is triturated with 5 ml. of water and the precipitate filtered, washed with water and dried under vacuum to give 121 mg. of crude (±)-zearalenone. The product is purified by preparative thin layer chromatography on silica gel G coated glass plates using chloroform 5 percent acetonitrile as the developing solvent. The product is removed from the glass plates, dissolved in a minimum volume of acetone, and hexane added to the acetone solution until crystallization begins. The crystalline product is filtered off and dried to give pure (±)-zearalenone.

EXAMPLE 6

(±)-Zearalenone 4-monomethyl ether (VIII)

To a stirred solution of 480 mg. of (±)-zearalenone dimethyl ether in 5 ml. of methylene chloride under nitrogen at 0° C. there is added a cooled (0° C.) solution of 2 ml. of boron trichloride in 2 ml. of methylene chloride. The reaction mixture is immediately poured onto 50 ml. of crushed ice with stirring. The mixture is made basic with potassium bicarbonate and extracted with methylene chloride. The latter extract is washed with saturated aqueous sodium chloride, dried over magnesium sulfate and taken to dryness under vacuum. Thin layer chromatography (silica gel G-chloroform-5 percent acetonitrile) shows the presence of a minor amount of (±)-zearalenone and a major amount of (±)-zearalenone-4-monomethyl ether. The monomethyl ether is isolated and purified by preparative thin layer chromatography (as described in Example 5) to afford substantially pure material.

Although the process of the instant invention has been illustrated above specifically in terms of the use of 3,5-dimethoxyhomophthalic anhydride as the starting material in the total chemical synthesis of (±)-zearalenone and its 4-methyl and 2,4-dimethyl ether derivatives, it will be obvious, of course, to anyone skilled in the art that 3,5-diloweralkoxyhomophthalic anhydrides other than the methoxy can be substituted as starting materials in the process of the instant invention to prepare not only (±)-zearalenone per se, but the corresponding 4-monoloweralkoxy- and 2,4-diloweralkoxy derivatives thereof, as well as correspondingly substituted intermediates. The term "loweralkoxy," as used herein, is intended to include both straight and branched chain alkoxide groups having from 1–6 carbon atoms in the alkyl moiety. Typical of such groups are for example, methoxy, ethoxy, propoxy, butoxy, isobutoxy, and the like. Such 3,5-diloweralkoxyhomophthalic anhydrides are either well known compounds per se, or may be prepared readily by conventional techniques fully described in the art.

Further, from a study of the foregoing description, many additional modifications in the process of the instant invention will suggest themselves to one skilled in the art. It will be obvious, for example, that homophthalic anhydrides bearing substituents other than alkoxy in the 3- and 5-positions may be employed as starting materials in the process of this invention to prepare (±)-zearalenones and intermediates bearing the corresponding substituent. Typical groups which may be substituted for the alkoxy group are for example, aryloxy groups such as phenoxy, aralkoxy groups such as benzyloxy and triphenylmethoxy, and loweralkanoyloxy groups such as acetoxy and propanoyloxy. Applicants consider all such obvious modifications to be the full equivalent of the embodiments specifically described herein and to fall within the scope of their invention.

The subject matter which applicants regard as their invention is particularly pointed out and distinctly claimed as follows:

What is claimed is:

1. The process for preparing (±)-zearalenone which comprises:
    (a) condensing a 3,5-diloweralkoxyhomophthalic anhydride with 4-(2'-methoxy - 6' - methyltetrahydropyran-2-yl)-butyraldehyde in pyridine to prepare the corresponding 3-(4' - oxo - 8' - hydroxynonyl)-6,8-diloweralkoxy - 3,4 - dihydroisocoumarin-4-carboxylic acid;
    (b) heating said 3-(4'-oxo-8'-hydroxynonyl)-6,8-diloweralkoxy-3,4-dihydroisocoumarin - 4 - carboxylic acid in the pressure of pyridine or methylated pyridines under an inert atmosphere to prepare the corresponding 2 - (10'-hydroxy-6'-oxo-1'-undecenyl) - 4,6-diloweralkoxybenzoic acid;
    (c) cyclizing said 2-(10'-hydroxy-6'-oxo-1'-undecenyl)-4,6-diloweralkoxybenzoic acid with trifluoroacetic anhydride to prepare (±)-zearalenone diloweralkyl ether; and
    (d) cleaving said (±)-zearalenone diloweralkyl ether with boron tribromide to form (±)-zearalenone.

2. The process of claim 1 wherein the 3,5-diloweralkoxyhomophthalic anhydride is 3,5-dimethoxyhomophthalic anhydride.

3. The process of claim 2 wherein the condensation is carried out at about room temperature in pyridine solution.

4. The process of claim 3 wherein the 3-(4'-oxo-8'-hydroxynonyl)-6,8-diloweralkoxy-3,4 - dihydroisocoumarin-4-carboxylic acid is heated to about 145° C. to 150° C. in the presence of γ-picoline.

5. A compound of the formula:

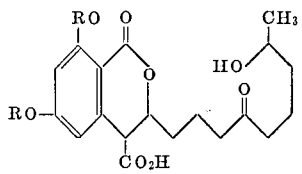

wherein R is loweralkyl.

6. The compound of claim 5 wherein R is methyl.

7. The process of preparing 3-(4'-oxo-8'-hydroxynonyl)-6,8-diloweralkoxy-3,4 - dihydroisocoumarin-4-carboxylic acid which comprises condensing a 3,5-diloweralkoxyhomophthalic anhydride with 4-(2'-methoxy-6'-methyltetrahydropyran-2-yl)-butyraldehyde in pyridine solution.

8. The process of claim 7 wherein the 3,5-diloweralkoxyhomophthalic anhydride is 3,5-dimethoxyhomophthalic anhydride.

9. The process of claim 8 wherein the condensation is carried out at about room temperature in pyridine solution.

References Cited

UNITED STATES PATENTS 3,373,039     3/1968     Hodge et al. _____ 260—343.2

JAMES A. PATTEN, Primary Examiner

U.S. Cl. X.R.

260—343.5, 345.1, 345.2, 345.9, 521, 594, 595